US012715966B2

(12) United States Patent
Okamoto et al.

(10) Patent No.: US 12,715,966 B2
(45) Date of Patent: Aug. 25, 2026

(54) WATER-SOLUBLE FILM AND PACKAGING

(71) Applicant: KURARAY CO., LTD., Okayama (JP)

(72) Inventors: Minoru Okamoto, Okayama (JP); Sayaka Shimizu, Okayama (JP); Osamu Kazeto, Okayama (JP)

(73) Assignee: KURARAY CO., LTD., Okayama (JP)

( * ) Notice: Subject to any disclaimer, the term of this patent is extended or adjusted under 35 U.S.C. 154(b) by 492 days.

(21) Appl. No.: 18/003,782

(22) PCT Filed: Jun. 14, 2021

(86) PCT No.: PCT/JP2021/022536
§ 371 (c)(1),
(2) Date: Dec. 29, 2022

(87) PCT Pub. No.: WO2022/004342
PCT Pub. Date: Jan. 6, 2022

(65) Prior Publication Data

US 2023/0312846 A1 Oct. 5, 2023

(30) Foreign Application Priority Data

Jun. 29, 2020 (JP) ................................ 2020-111937

(51) Int. Cl.
*B65D 65/46* (2006.01)
*C08J 5/18* (2006.01)
*C08L 29/04* (2006.01)
*C09D 129/04* (2006.01)

(52) U.S. Cl.
CPC ................ *C08J 5/18* (2013.01); *B65D 65/46* (2013.01); *C08L 29/04* (2013.01); *C08J 2300/14* (2013.01); *C08J 2329/04* (2013.01); *C09D 129/04* (2013.01); *Y10T 428/1341* (2015.01); *Y10T 428/1379* (2015.01)

(58) Field of Classification Search
CPC .... B65D 65/46; C09D 129/04; C08J 2300/14; C08J 2329/04; C08J 5/18; C08J 7/123; Y10T 428/1341; Y10T 428/1379
USPC ............................................ 428/34.1–36.92
See application file for complete search history.

(56) References Cited

U.S. PATENT DOCUMENTS 5,484,881 A * 1/1996 Gruber .................... C08L 67/04 156/244.11
9,908,957 B2 3/2018 Mori et al.
2004/0092635 A1 5/2004 Kitamura et al.
2016/0194465 A1* 7/2016 Takafuji ................ C08F 216/06 424/405
2016/0326285 A1 11/2016 Mori et al.
2018/0105338 A1* 4/2018 Ieda ....................... B65D 65/42
2019/0002683 A1 1/2019 Michitaka et al.
2019/0211289 A1* 7/2019 Friedrich ................ C11D 3/50
2019/0300693 A1 10/2019 Nii et al.
2019/0359795 A1 11/2019 Sakai et al.
2021/0009774 A1 1/2021 Ichiki
2021/0130576 A1 5/2021 Kani
2021/0324156 A1 10/2021 Okamoto et al.
2021/0324161 A1 10/2021 Okamoto et al.
2021/0324162 A1 10/2021 Okamoto et al.
2021/0324164 A1 10/2021 Okamoto et al.
2022/0041824 A1 2/2022 Okamoto et al.
2022/0204711 A1* 6/2022 Menozzi ................ C08J 7/0427

FOREIGN PATENT DOCUMENTS

CN 104662071 A * 5/2015 ................ C08J 5/18
EP 3348608 A1 7/2018
EP 3677405 A1 7/2020
EP 3904231 A1 11/2021
EP 3904435 A1 11/2021
EP 3904437 A1 11/2021
JP 2001329130 A * 11/2001
JP 2003-206380 A 7/2003
JP 2004-161823 A 6/2004
JP 2005-179390 A 7/2005
JP 2006-188655 A 7/2006
JP 2006-188661 A 7/2006
JP 2006-307059 A 11/2006
JP WO2008/142835 A1 11/2008
JP 2008290406 A 12/2008
JP 2009-051947 A 3/2009
JP WO2009/028141 A1 3/2009
JP 2009154449 A 7/2009
JP 2009-535484 A 10/2009
JP WO2011/132592 A1 10/2011
JP 2012-082313 A 4/2012
(Continued)

OTHER PUBLICATIONS

Extended European Search Report issued in the related Application No. 21831690.9, mailed Jun. 26, 2024.
Extended European Search Report issued in the related Application No. 21831989.5, mailed Jun. 26, 2024.
Extended European Search Report issued in the related Application No. 21834693.0, mailed Jun. 19, 2024.
Extended European Search Report issued in the related Application No. 21831991.1, mailed Jun. 19, 2024.
Extended European Search Report issued in the related Application No. 21833496.9, mailed Jun. 26, 2024.
"Basic Physical Properties of PVOH Resin: 1. Basic Physical Properties of POVH", kuraray.
(Continued)

*Primary Examiner* — Michael C. Romanowski
(74) *Attorney, Agent, or Firm* — Morgan, Lewis & Bockius LLP

(57) ABSTRACT

[Problem to be solved] To provide a water-soluble film capable of achieving both cold water solubility and resistance to oxidative deterioration.

[Solution] A water-soluble film containing a polyvinyl alcohol resin, wherein the water-soluble film has a surface on at least one side in which an abundance ratio of carbonyl in all carbon bonds obtained by X-ray photoelectron spectroscopy is 1 to 5%, and a complete dissolution time in water at 10° C. is 120 seconds or less.

19 Claims, No Drawings

(56) References Cited

FOREIGN PATENT DOCUMENTS

| | | | | | |
|---|---|---|---|---|---|
| JP | WO2013/146147 | A1 | | 10/2013 | |
| JP | WO2015/020045 | A1 | | 2/2015 | |
| JP | WO2015/118978 | A1 | | 8/2015 | |
| JP | WO2016/190235 | A1 | | 12/2016 | |
| JP | 2017-052841 | A | | 3/2017 | |
| JP | 2017-078166 | A | | 4/2017 | |
| JP | 2017-100806 | A | | 6/2017 | |
| JP | 2017-533304 | A | | 11/2017 | |
| JP | WO2018/008736 | A1 | | 1/2018 | |
| JP | 2018-031015 | A | | 3/2018 | |
| JP | WO2018/061272 | A1 | | 4/2018 | |
| JP | 2018-154714 | A | | 10/2018 | |
| JP | 2019-006423 | A | | 1/2019 | |
| JP | 2019-014109 | A | | 1/2019 | |
| JP | WO2019/124310 | A1 | | 6/2019 | |
| JP | 2019177585 | A | | 10/2019 | |
| JP | WO2019/189684 | A1 | | 10/2019 | |
| JP | WO2020/004608 | A1 | | 1/2020 | |
| JP | WO2020/027021 | A1 | | 2/2020 | |
| JP | WO2020/138437 | A1 | | 7/2020 | |
| JP | WO2020/138438 | A1 | | 7/2020 | |
| JP | WO2020/138442 | A | | 7/2020 | |
| JP | WO2020/138443 | A1 | | 7/2020 | |
| KR | 10-0590311 | B1 | | 6/2006 | |
| KR | 101463799 | B1 | * | 11/2014 | ............ C08J 7/0427 |
| WO | 2007/133415 | A1 | | 11/2007 | |
| WO | 2016/061054 | A1 | | 4/2016 | |
| WO | 2016061026 | A1 | | 4/2016 | |
| WO | WO-2016190235 | A1 | * | 12/2016 | .............. C08L 29/04 |
| WO | 2017/110749 | A1 | | 6/2017 | |
| WO | 2019/044751 | A1 | | 3/2019 | |
| WO | 2020/027020 | A1 | | 2/2020 | |
| WO | 2020138441 | A1 | | 7/2020 | |
| WO | 2020138443 | A1 | | 7/2020 | |
| WO | 2020138444 | A1 | | 7/2020 | |
| WO | 2020/218321 | A1 | | 10/2020 | |

OTHER PUBLICATIONS

Paneru et al., "Surface modification of PVA thin film by nonthermal atmospheric pressure plasma for antifoggin, AIP property", Jul. 10, 2019, AIP Advances 9, 075008.

Peng et al. "Influence of absorbed moisture on solubility of poly-(vinyl alcohol) film during atmospheric pressure plasma jet treatment", Surface & Coatings Technology, 204 (2010) 1222-1228.

Akhter et al., "XPS and IR Study of X-Ray Induced Degradation of PVA Polymer Film", Applied Surface Science, 1998-89, 241-258.

Office Action issued in Chinese Patent Application No. 202180046095.9, dated Jan. 4, 2025.

Sakurai, et al.,"Small-Angle X-ray Scattering Study of Lamellar Microdomains in a Block Copolymer," J Appl Cryst, 24: 679-684 (1991).

International Search Report issued in related International Patent Application No. PCT/JP2021/022536 dated Aug. 31, 2021.

International Search Report issued in related International Patent Application No. PCT/JP2021/022537 dated Aug. 17, 2021.

International Search Report issued in related International Patent Application No. PCT/JP2021/022538 dated Aug. 31, 2021.

International Search Report issued in related International Patent Application No. PCT/JP2021/022540 dated Jul. 13, 2021.

International Search Report issued in related International Patent Application No. PCT/JP2021/022535 dated Aug. 24, 2021.

International Search Report issued in related International Patent Application No. PCT/JP2021/022539 dated Aug. 31, 2021.

Office Action issued in Japanese Patent Application No. 2022-533806, dated Apr. 22, 2025.

Office Action issued in Japanese Patent Application No. 2022-533809, dated Apr. 22, 2025.

Office Action issued in Chinese Patent Application No. 202180046089.3, dated May 14, 2025.

Office Action issued in Chinese Patent Application No. 202180046093.X, dated Jun. 5, 2025.

Office Action issued in Chinese Patent Application No. 202180046098.2, dated May 21, 2025.

Office Action issued in Chinese Patent Application No. 202180046124.1, dated May 16, 2025.

Office Action issued in Chinese Patent Application No. 202180046093.X, dated Oct. 24, 2025.

Office Action issued in related U.S. Appl. No. 18/003,797, Oct. 31, 2025.

Decision on Rejection issued in Chinese Patent Application No. 202180046124.1, dated Jan. 15, 2026.

Office Action issued in Japanese Patent Application No. 2022-533809, dated Mar. 3, 2026.

Office Action issued in related U.S. Appl. No. 18/003,785, dated Dec. 31, 2025.

Office Action issued in related U.S. Appl. No. 18/003,793, dated Mar. 25, 2026.

Office Action issued in related U.S. Appl. No. 18/003,771, dated Mar. 13, 2026.

Office Action issued in related CN Application No. 202180046089.3, Action dated Sep. 19, 2025.

Office Action issued in related CN Application No. 202180046124.1, dated Sep. 29, 2025.

Office Action issued in related JP Application No. 2022-533809, dated Sep. 16, 2025.

Office Action issued in related U.S. Appl. No. 18/003,791, dated Jul. 24. 2025.

Office Action issued in related U.S. Appl. No. 18/003,771, dated Aug. 6, 2025.

Office Action issued in Chinese Patent Application No. 202180046089.3, dated Mar. 25, 2026.

* cited by examiner

WATER-SOLUBLE FILM AND PACKAGING

TECHNICAL FIELD

The present invention relates to a water-soluble film suitably used for packaging various chemicals and a package using the same.

RELATED ART

Conventionally, water-soluble films have been used in a wide range of fields, taking advantage of their water-solubility, such as packaging of various chemicals such as liquid detergents and pesticides, and seed tapes encapsulating seeds.

For water-soluble films to be used for such an application, polyvinyl alcohol based resins (hereinafter, may be referred to as "PVA") are mainly used, and films with improved water solubility have been proposed by blending various additives such as plasticizers or by using modified polyvinyl alcohol (see, for example, Patent Document 1).

In the above-mentioned conventional method, the water solubility is improved by devising to lower crystallinity of PVA. However, in recent years, demand for packages of liquid detergent has been increasing, and in the case of oxidizing agents, an inner surface of the water-soluble film in contact with the agents tends to be oxidatively deteriorated. Oxidative deterioration may reduce the strength of the water-soluble film and cause breaking.

PRIOR ART DOCUMENT

Patent Document

Patent Document 1: JP-A 2017-078166

SUMMARY OF THE INVENTION

Problem to be Solved by the Invention

Oxidative deterioration is known to occur particularly easily starting from carbonyl (hereinafter, may be referred to as "C═O") of PVA. In addition, it is known that starting from a terminal aldehyde of PVA, a dehydration reaction occurs in the vinyl alcohol unit located next to it to generate a carbon-carbon double bond (hereinafter, may be referred to as "C═C"), and a conjugated double bond structure, a so-called polyene structure, is formed by further inducing a dehydration reaction in the adjacent vinyl alcohol unit. When a large amount of this polyene structure exists on the surface of the water-soluble film, hydrophobicity of the water-soluble film increases and resistance to oxidative deterioration improves. On the other hand, if the hydrophobicity of the water-soluble film is too high, solubility of the film in cold water (cold water solubility) will decrease. That is, there is a trade-off relationship between the cold water solubility and the resistance to oxidative deterioration of the water-soluble film. In conventional water-soluble films, it has been difficult to achieve both the cold water solubility and the resistance to oxidative deterioration.

Accordingly, an object of the present invention is to provide a water-soluble film capable of achieving both the cold water solubility and the resistance to oxidative deterioration.

Means for Solving the Problem

X-ray photoelectric spectroscopy (hereinafter, may be referred to as "XPS") is a method for quantifying an amount of elements present on the film surface or the like. In the case of a water-soluble film using PVA, it is possible to quantify each element such as fluorine (F) and silicon (Si) in addition to carbon (C) and oxygen (O) by XPS measurement.

Further, it is also possible to determine bonding state of the element and its abundance ratio from a detailed analysis of each element by XPS. For example, while distinguishing between carbon-carbon single bond (hereinafter, may be referred to as "C—C") and C═O, it is possible to determine the ratio of each bond in all carbon bonds.

The present inventors have made intensive studies based on the knowledge of detailed analysis of various elements by XPS, and as a result, the inventors have found that the above object is achieved by adjusting an abundance ratio of carbonyl in all carbon bonds, which is obtained by analyzing the surface of one or both surfaces of the water-soluble film by the X-ray photoelectron spectroscopy, to a specific range. Based on this knowledge, the inventors have further studied and completed the present invention.

That is, the present invention relates to:

[1] A water-soluble film containing a polyvinyl alcohol resin, wherein the water-soluble film has a surface on at least one side in which an abundance ratio of carbonyl in all carbon bonds obtained by X-ray photoelectron spectroscopy is in the range of 1 to 5%, and a complete dissolution time in water at 10° C. is 120 seconds or less.

Further, the present invention relates to:

[2] The water-soluble film in the above-mentioned item [1], wherein on the surface where the abundance ratio of carbonyl in all the carbon bonds is within the above range, a ratio (C—C/C═O) of an abundance ratio of carbon-carbon single bond obtained by the X-ray photoelectron spectroscopy to the abundance ratio of carbonyl is 10 to 50;

[3] The water-soluble film in the above-mentioned item [1] or [2], wherein on the surface where the abundance ratio of carbonyl in all the carbon bonds is within the above range, an abundance ratio of carbon in all elements obtained by the X-ray photoelectron spectroscopy is 50 to 70%, an abundance ratio of oxygen is 20 to 35%, and a ratio of carbon to oxygen (C/O) is 1.5 to 3.5;

[4] The water-soluble film in any one of the above-mentioned items [1] to [3], wherein the surface having the abundance ratio of carbonyl in all the carbon bonds within the above range is subjected to surface modification; and

[5] The water-soluble film in the above-mentioned item [4], wherein the surface modification is by any method of ultraviolet treatment, ozone treatment, corona treatment, and plasma treatment.

Furthermore, the present invention relates to:

[6] A package in which the water-soluble film described in any one of the above mentioned items [1] to [5] stores a chemical;

[7] The package in the above-mentioned item [6], wherein the chemical is a pesticide or a detergent;

[8] The package in the above-mentioned item [6] or [7], wherein the chemical is in a liquid form; and

[9] The package in any one of the above-mentioned items [6] to [8], wherein the chemical is stored so that the surface having the abundance ratio of carbonyl in all the carbon bonds within the range of 1 to 5% is in contact with the chemical.

Effects of the Invention

According to the present invention, it is possible to provide a water-soluble film capable of achieving both cold water solubility and resistance to oxidative deterioration.

MODE FOR CARRYING OUT THE INVENTION

The present invention is specifically described below.

<Xps Measurement>

In the present invention, an amount of elements on a surface of a water-soluble film is measured by XPS. XPS measurement involves irradiating a surface of a sample with X-rays to excite inner-shell electrons of atoms and detecting a kinetic energy of emitted photoelectrons to identify and quantify elements existing on the surface of the sample and to analyze chemical bonding state. XPS analysis can measure elements existing at a depth of about 2 to 8 nm from the surface.

In this XPS measurement, when a horizontal axis is kinetic energy and a vertical axis is intensity, a peak attributed to C1s is obtained due to photoelectrons derived from carbon atoms existing on the sample surface. This peak is a composite of various peaks depending on bonding state of carbon atoms. Positions of these various peaks are determined by the bonding state of the carbon atoms. For example, C—C or carbon-hydrogen bond (hereinafter, may be referred to as "C—H") shows a peak at 285 eV, carbon-oxygen single bond (hereinafter, may be referred to as "C—O") shows a peak at 286.6 eV, carbon-nitrogen single bond (hereinafter, may be referred to as "C—N") shows a peak at 285.7 eV, C═O shows a peak at 287.7 eV, ester bond (hereinafter, may be referred to as "C(═O)—O") shows a peak at 289.4 eV, and carbonate bond (hereinafter, may be referred to as "O—C(═O)—O") shows a peak at 290 eV. The C1s peaks obtained by synthesizing these peaks can be separated into individual peaks, for example, by automatic waveform separation fitting attached to an XPS analyzer (Reference patent document: JP-A-2007-302740).

The peaks attributed to each of the above bonds are obtained by detailed analysis (narrow scan) of C1s. The narrow scan is an analysis method in which a narrow energy range is scanned under high energy resolution conditions, and the chemical state of the element to be analyzed can be specified from the peak positions and peak shapes.

The water-soluble film of the present invention is a water-soluble film in which an abundance ratio of C═O in all carbon bonds is in the range of 1 to 5% on at least one surface. If the abundance ratio of C═O is less than 1%, the film surface becomes hydrophobic and sufficient cold water solubility cannot be ensured. On the other hand, if the ratio is more than 5%, the resistance to oxidative deterioration is poor, and breaking or the like occurs.

The abundance ratio of C═O is preferably 1.5% or more, more preferably 2.0% or more, and even more preferably 2.5% or more. The abundance ratio of C═O is preferably 4.5% or less, more preferably 4.0% or less, and particularly preferably 3.5% or less.

Note that regarding the "abundance ratio of C═O in all carbon bonds", the C1s peak is analyzed in detail by the narrow scan described above, the automatic waveform separation fitting described above determines the ratio of the peak attributed to C═O in the C1s peak, and the ratio (%) is defined as the abundance ratio of C═O.

In the present invention, the abundance ratio of C═O in the surface portion may be in the range of 1 to 5% on either one side or both sides of the water-soluble film. In the case of only one side, it is preferable to turn that side to the side where oxidative deterioration is likely to occur when manufacturing the package. That is, when a chemical or the like to be packaged has an oxidizing property, it is preferable to use a package in which the chemical is enclosed such that with the surface having the abundance ratio of C═O in the range of 1 to 5% on the inside, the surface having the abundance ratio of C═O in the range of 1 to 5% is in contact with the chemical.

In the case of the package in which three or more water-soluble films are used, and the chemical is packaged between each film, which has been used in an increasing amount in recent years, for the film in which both sides of the film are in contact with the chemical, it is preferable that the abundance ratios of C═O on both surfaces of the film are in the range of 1 to 5%.

In the water-soluble film of the present invention, as described above, the abundance ratio of C═O on at least one surface is in the range of 1 to 5%, and from the viewpoint of resistance to oxidative deterioration, the surface has a ratio of an abundance ratio of C—C obtained by the X-ray photoelectron spectroscopy to the abundance ratio of C═O (hereinafter, may be abbreviated as "C—C/C═O") is preferably 10 to 50, more preferably 10 to 20.

Like the abundance ratio of C═O, the abundance ratio of C—C is obtained by analyzing the C1s peak in detail by the narrow scan described above, and by the automatic waveform separation fitting described above, a ratio of a peak attributed to the carbon-carbon single bond in the C1s peak is obtained, and the ratio (%) is defined as the abundance ratio of C—C. A value obtained by dividing the abundance ratio of C—C by the abundance ratio of C═O is defined as C—C/C═O.

In addition, on the surface having the abundance ratio of C═O in the range of 1 to 5%, from the viewpoint of cold water solubility, it is preferable that an abundance ratio of carbon in all elements obtained by XPS measurement is 50 to 70%, an abundance ratio of oxygen is 20 to 35%, and a ratio of carbon to oxygen is 1.5 to 3.5.

Here, cold water solubility is the solubility in water at a temperature of 10° C.

Almost all kinds of elements can be measured by XPS measurement. In the present invention, as a result of XPS measurement of the film surface, the measured carbon, nitrogen, oxygen, fluorine, sodium, silicon, phosphorus and sulfur (all these measured elements may hereinafter be referred to as "all the elements measured") are quantified, and the ratio of the carbon element and the ratio of the oxygen element to the total amount are defined as the abundance ratio of carbon and the abundance ratio of oxygen, respectively.

In general, when the surface of a PVA film is subjected to XPS measurement, the measured elements originate from PVA, plasticizers, additives, etc., which will be described later. That is, elements other than the above carbon, nitrogen, oxygen, fluorine, sodium, silicon, phosphorus and sulfur can be measured depending on types of plasticizers, additives, etc. contained in the PVA film. In the present invention, the ratio of the carbon element and the ratio of the oxygen element to the total amount of all the elements measured above are defined as the abundance ratio (%) of carbon and the abundance ratio (%) of oxygen, respectively.

Further, the ratio of carbon to oxygen (hereinafter, may be abbreviated as "C/O") is a value obtained by dividing the abundance ratio of carbon by the abundance ratio of oxygen.

When the abundance ratio of carbon is less than 50% or exceeds 70%, cold water solubility tends to decrease. The abundance ratio of carbon in all elements is more preferably 52.5 to 67.5%, more preferably 55 to 65%.

When the abundance ratio of oxygen is less than 20%, the cold water solubility tends to decrease, and when it exceeds 35%, the resistance to oxidative deterioration tends to decrease. The abundance ratio of oxygen in all elements is more preferably 22.5 to 32.5%, more preferably 25 to 30%.

Further, when C/O is less than 1.5 or exceeds 3.5, the resistance to oxidative deterioration tends to be poor. C/O is more preferably 1.7 to 3.3, and even more preferably 1.9 to 3.1.

In addition, on the surface of the water-soluble film of the present invention having the abundance ratio of C═O in the range of 1 to 5%, the abundance ratio of elements other than carbon and oxygen, i.e., nitrogen, fluorine, sodium, silicon, phosphorus, and sulfur, is 0.1 to 30% in total.

In the water-soluble film of the present invention, the abundance ratio of C═O on at least one surface is in the range of 1 to 5%, and it is preferable that both of the following conditions (1) and (2) are satisfied.

(1) from the viewpoint of oxidative resistance, C—C/C═O of the surface is 10 to 50, more preferably 10 to 20, and (2) from the viewpoint of cold water solubility or resistance to oxidative deterioration, the abundance ratio of carbon in all elements on the surface is 50 to 70%, and the abundance ratio of oxygen is 20 to 35%, and the ratio of carbon to oxygen (C/O) is 1.5 to 3.5.

In the present invention, it is important to adjust the abundance ratio of C═O on the surface of the water-soluble film, and if necessary, C—C/C═O, the abundance ratio of carbon, the abundance ratio of oxygen, or C/O within the above ranges. Methods for adjusting the above range include, for example, a method of treating the film surface by controlling treatment conditions such as UV treatment, ozone treatment, corona treatment and plasma treatment, alternatively, a method of applying a chemical solution containing a surfactant to the film surface, a method of adding a suitable surfactant to the PVA film, a method of adjusting the humidity atmosphere in the process of volatilizing the solvent when forming the PVA film, etc.

For example, as will be described later, in a solvent volatilization step, if the drying temperature is raised or the humidity during drying is lowered, the abundance ratio of C═O tends to decrease. Therefore, by appropriately adjusting the drying temperature and humidity, the abundance ratio of C═O can be appropriately controlled.

In addition, when the film surface is subjected to corona treatment, the abundance ratio of C═O tends to increase as the amount of corona discharge increases. This tendency is considered to be the same in other surface treatment methods such as UV treatment, ozone treatment, and plasma treatment, and the abundance ratio of C═O can be adjusted by adjusting the amount of discharge in each treatment.

The methods for treating the film surface, such as the UV treatment, the ozone treatment, the corona treatment and the plasma treatment, are preferred from the viewpoint of production costs and solvent treatment.

A complete dissolution time when the water-soluble film of the present invention is immersed in water at 10° C. is 120 seconds or less. Since the complete dissolution time is 120 seconds or less, it can be suitably used as a packaging film for chemicals and the like. The complete dissolution time is preferably 90 seconds or less, more preferably 60 seconds or less, and even more preferably 45 seconds or less. On the other hand, a lower limit of the complete dissolution time is not particularly limited, but the water-soluble film whose complete dissolution time is too short tends to easily cause blocking between films and reduction in film strength due to absorption of moisture in the atmosphere. Therefore, the complete dissolution time is preferably 5 seconds or more, more preferably 10 seconds or more, even more preferably 15 seconds or more, and particularly preferably 20 seconds or more.

The complete dissolution time when the water-soluble film is immersed in water at 10° C. can be measured as follows. Deionized water is used as water in the complete dissolution time measurement.

<1> The water-soluble film is place in a thermo-hygrostat adjusted to 20° C.-65% RH for 16 hours or more to condition the humidity.

<2> After cutting out a rectangular sample of length 40 mm×width 35 mm from the humidity-conditioned water-soluble film, the sample is sandwiched and fixed between two plastic plates of 50 mm×50 mm with rectangular windows (holes) of 35 mm length×23 mm width so that the longitudinal direction of the sample is parallel to the longitudinal direction of the window and the sample is positioned substantially at the center of the window in the width direction.

<3>300 mL of deionized water is poured into a 500 mL beaker and adjust the water temperature to 10° C. while stirring with a magnetic stirrer equipped with a 3 cm long bar at 280 rpm.

<4> The sample fixed to the plastic plate in <2> above is immersed in the deionized water in the beaker while being careful not to let it come into contact with the bar of the magnetic stirrer.

<5> The time from immersion in the deionized water until the sample immersed in the deionized water completely disappears is measured.

The complete dissolution time measured by the above method depends on the thickness of the sample, but in this specification, the complete dissolution time is defined as the complete dissolution of the sample of the above size regardless of the thickness.

<Polyvinyl Alcohol Resin>

The water-soluble film of the present invention contains PVA. As the PVA, a polymer produced by saponifying a vinyl ester polymer obtained by polymerizing a vinyl ester monomer can be used. Examples of vinyl ester monomers include vinyl formate, vinyl acetate, vinyl propionate, vinyl valerate, vinyl laurate, vinyl stearate, vinyl benzoate, vinyl pivalate, and vinyl versatate, and the like. Among them, vinyl acetate is preferable as the vinyl ester monomer.

The vinyl ester polymer is preferably obtained using only one or two or more kinds of vinyl ester monomer as a monomer and more preferably obtained using only one kind of vinyl ester monomer as the monomer, and may be a copolymer of one or two or more kinds of vinyl ester monomer and other monomer copolymerizable therewith.

Examples of such other monomer copolymerizable with the vinyl ester monomer include, for example, ethylene; olefins having a carbon number from 3 to 30, such as propylene, 1-butene, and isobutene; acrylic acid and salts thereof; acrylic esters, such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acid and salts thereof; methacrylic esters, such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamide derivatives, such as acrylamide, N-methylacrylamide, N-ethylacrylamide, N,N-dimethylacrylamide, diacetone acrylamide, acrylamidopropanesulfonic acid and salts thereof, acrylamide propyldimethylamine and salts thereof, and N-methylolacrylamide and derivatives thereof; methacrylamide derivatives, such as methacrylamide, N-methylmethacrylamide, N-ethylmethacrylamide, methacrylamidopropanesulfonic acid and salts thereof, methacrylamide propyldimethylamine and salts thereof, and N-methylolmethacrylamide and derivatives thereof; N-vinylamides, such as N-vinylformamide, N-vinylacetamide, and N-vinylpyrrolidone; vinyl ethers, such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; vinyl cyanides, such as acrylonitrile and methacrylonitrile; vinyl halides, such as vinyl chloride, vinylidene chloride, vinyl fluoride, and vinylidene fluoride; allyl compounds, such as allyl acetate and allyl chloride; maleic acid and salts, esters, and acid anhydrides thereof; itaconic acid and salts, esters, and acid anhydrides thereof; vinylsilyl compounds, such as vinyltrimethoxysilane; isopropenyl acetate; and the like. The vinyl ester polymer may have a structural unit derived from one or two or more kinds of the other monomer above.

From the viewpoint of the water solubility and mechanical strength of the water-soluble film, the ratio of structural units derived from other monomer in the vinyl ester polymer is preferably 15 mol % or less, more preferably 5 mol % or less, based on the number of moles of all structural units constituting the vinyl ester based polymer.

A degree of polymerization of the PVA is preferably 200 or more, more preferably 300 or more, and even more preferably 500 or more, from the viewpoint of the film strength. On the other hand, the degree of polymerization is preferably 8,000 or less, more preferably 5,000 or less, and even more preferably 3,000 or less from the viewpoint of PVA productivity, productivity of the water-soluble film, and the like. Here, the degree of polymerization means the average degree of polymerization measured in accordance with the description of JIS K 6726-1994, and the degree of polymerization is determined by the following formula from the intrinsic viscosity [η](unit: deciliter/g) measured in water at 30° C. after resaponifying and purifying of the PVA.

$$\text{Degree of polymerization } P_o=([\eta]\times 10^4/8.29)^{(1/0.62)}$$

In the present invention, the degree of saponification of the PVA is preferably 64 to 99.99 mol %. By adjusting the degree of saponification of the PVA in this range, it is easy to achieve both water solubility and physical properties of the film. The degree of saponification is more preferably 70 mol % or more, and even more preferably 75 mol % or more. On the other hand, the degree of saponification is more preferably 99.95 mol % or less, and even more preferably 99.92 mol % or less. In this context, the degree of saponification of the PVA means a ratio (mol %) indicating the number of moles of the vinyl alcohol units based on the total number of moles of the structural units (typically, vinyl ester based monomer units) that may be converted to vinyl alcohol units by saponification and the vinyl alcohol units in the PVA. The degree of saponification of the PVA can be measured in accordance with the description of JIS K6726-1994.

The water-soluble film of the present invention may contain one type of PVA singly or may contain two or more types of PVA having different degrees of polymerization, saponification, modification, and the like.

In the present invention, a content of the PVA in the water-soluble film is not particularly limited, but it is preferably 50% by mass or more, more preferably 80% by mass or more, and even more preferably 85% by mass or more.

<Plasticizer>

In the state of containing no plasticizer, the water-soluble film of the present invention is rigid compared with other plastic films and sometimes have problems of the mechanical properties, such as impact strength, processability during secondary processing, and the like. To prevent these problems, the water-soluble film of the present invention preferably contains a plasticizer. Examples of preferred plasticizers include polyhydric alcohols, and specific examples include polyhydric alcohols, such as ethylene glycol, glycerin, diglycerin, propylene glycol, diethylene glycol, triethylene glycol, tetraethylene glycol, trimethylolpropane, sorbitol, and the like. One kind of these plasticizers may be singly used or two or more kinds of them may be used together. Among these plasticizers, from the viewpoint of not readily bleeding out to the surface of the film and the like, ethylene glycol or glycerin are preferable and glycerin is more preferable.

A content of the plasticizer in the PVA film is preferably 1 parts by mass or more, more preferably 3 parts by mass or more, and even more preferably 5 parts by mass or more with respect to 100 parts by mass of the PVA contained in the water-soluble film. Also, the content of the plasticizer is preferably 70 parts by mass or less, more preferably 50 parts by mass or less, and even more preferably 40 parts by mass or less. If the content of the plasticizer is less than 1 part by mass, the effect of improving mechanical properties such as impact strength may not be sufficient. On the other hand, if the above content exceeds 70 parts by mass, the film may become too flexible, resulting in reduced handleability or bleeding out to the film surface.

<Starch/Water-Soluble Polymer>

For the purpose of imparting mechanical strength to the water-soluble film, maintaining the moisture resistance for handling the film, regulating the rate of flexibilization due to water absorption during the dissolution of the film, or the like, the film of the present invention may contain starch and/or a water-soluble polymer other than PVA.

Examples of the starch include natural starches, such as corn starch, potato starch, sweet potato starch, wheat starch, rice starch, tapioca starch, and sago starch; processed starches subjected to etherification, esterification, oxidation, and the like; and the like, and processed starches are particularly preferable.

A content of starch in the water-soluble film is preferably 15 parts by mass or less, and more preferably 10 parts by mass or less with respect to 100 parts by mass of the PVA. When the content of the starch exceeds 15 parts by mass, there is a risk that processability may deteriorate.

Examples of the water-soluble polymers other than the PVA include dextrin, gelatin, glue, casein, shellac, gum arabic, polyacrylic acid amide, sodium polyacrylate, polyvinyl methyl ether, copolymers of methyl vinyl ether and maleic anhydride, Copolymers of vinyl acetate and itaconic acid, polyvinylpyrrolidone, cellulose, acetylcellulose, acetylbutylcellulose, carboxymethylcellulose, methylcellulose, ethylcellulose, hydroxyethylcellulose, sodium alginate, and the like.

A content of the water-soluble polymer other than the PVA in the water-soluble film is preferably 15 parts by mass or less, and more preferably 10 parts by mass or less with respect to 100 parts by mass of the PVA. When the content exceeds 15 parts by mass, the water solubility of the water-soluble film may be insufficient.

<Surfactant>

In the production of the water-soluble film, it is preferable to add a surfactant to the water-soluble film from the viewpoint of improving handleability and peelability from the film forming apparatus when producing the water-soluble film. Further, by adding an appropriate surfactant to the water-soluble film, the abundance ratio of C═O on the surface of the water-soluble film of the present invention and, if necessary, C—C/C═O, the abundance ratios of carbon and oxygen, and C/O can be set within a desired range. Examples of types of surfactants include anionic surfactants and nonionic surfactants.

Examples of the anionic surfactants include carboxylic acid type surfactants such as potassium laurate; sulfate type surfactants such as octyl sulfate; and sulfonic acid type surfactants such as dodecylbenzenesulfonate.

Examples of the nonionic surfactants include alkyl ether type surfactants such as polyoxyethylene lauryl ether and polyoxyethylene oleyl ether; alkylphenyl ether type surfactants such as polyoxyethylene octylphenyl ether; alkyl ester type surfactants such as polyoxyethylene laurate; alkyl amine type surfactants such as polyoxyethylene lauryl amino ether; alkyl amide type surfactants such as polyoxyethylene lauric acid amide; polypropylene glycol ether type surfactants such as polyoxyethylene polyoxypropylene ether; alkanolamide-type surfactants such as lauric acid diethanolamide and oleic acid diethanolamide; and allyl phenyl ether type surfactants such as polyoxyalkylene allyl phenyl ether, and the like.

Such surfactants may be used singly or in combination of two or more.

In the present invention, the surfactant that tend to gather on the surface of the film rather than disperse uniformly in the water-soluble film is preferable in order to obtain effects even when added in a small amount. For that purpose, it is preferable to select a material having an appropriate affinity for PVA. Surfactants with too high affinity for the PVA have a strong tendency to disperse uniformly, and surfactants with too low affinity tend to phase-separate to form droplets in the film, reduce the transparency of the film, or bleed out to the surface.

In addition, the surfactants having moderate affinity for the PVA tends to gather on the surface of the PVA film during film formation. Therefore, by adjusting the type and amount of the surfactant, it is possible to control the abundance ratio of C═O on the film surface.

As examples of the surfactants having moderate affinity for the PVA, the nonionic surfactants are preferred, alkanolamide-type surfactants are more preferred, and dialkanolamides (e.g., diethanolamide, etc.) of aliphatic carboxylic acids (e.g., saturated or unsaturated aliphatic carboxylic acids having 8 to 30 carbon atoms, etc.) are even more preferred.

A content of the surfactant in the water-soluble film is preferably 0.01 parts by mass or more, more preferably 0.02 parts by mass, and even more preferably 0.05 parts by mass with respect to 100 parts by mass of the PVA, from the viewpoint of the film formability and peelability of the resulting film. On the other hand, the content of the surfactant is preferably 10 parts by mass or less, more preferably 1 part by mass or less, even more preferably 0.5 part by mass or less, and particularly preferably 0.3 parts by mass or less, from the viewpoint of bleeding out to the surface of the resulting film and cohesiveness of the surfactant. When the content is less than 0.01 part by mass, the film formability tends to deteriorate. In addition, the peelability from the film forming apparatus during the production of the PVA film is lowered, or blocking is likely to occur between the films. On the other hand, when the content exceeds 10 parts by mass, bleeding out to the film surface and deterioration of the film appearance due to aggregation of the surfactant tend to occur.

<Other Components>

The water-soluble film of the present invention may contain components such as moisture, antioxidants, UV absorbers, lubricants, cross-linking agents, coloring agents, fillers, preservatives, antifungal agents, and other polymer compounds other than the plasticizer, the starch, the water-soluble polymer other than the PVA, and the surfactant, as long as they do not interfere with the effects of the present invention. A ratio of the total weight of the PVA, plasticizer, starch, water-soluble polymer other than PVA, and surfactant to the total weight of the water-soluble film of the present invention is preferably in the range of 60 to 100% by mass, more preferably in the range of 80 to 100% by mass, and even more preferably in the range of 90 to 100% by mass.

From the viewpoint of the secondary processability of the resulting film, a thickness of the water-soluble film is preferably 200 μm or less, more preferably 150 μm or less, even more preferably 100 μm or less, and particularly preferably 50 μm or less. Further, from the viewpoint of the mechanical strength of the water-soluble film, the thickness of the water-soluble film is preferably 5 μm or more, more preferably 10 μm or more, even more preferably 15 μm or more, and particularly preferably 20 μm or more. The thickness of the water-soluble film can be obtained by measuring the thickness at 10 arbitrary points (for example, 10 arbitrary points on a straight line drawn in the length direction of the PVA film) and calculating the average value of the measured thicknesses.

<Method for Producing Water-Soluble Film>

The method for producing the water-soluble film of the present invention is not particularly limited to. The method may be an arbitrary method, such as a film formation method where a solvent, additives, and the like are added to the PVA and homogenized to obtain a film forming stock solution to be used in casting film formation, wet film formation (discharge into a poor solvent), dry/wet film formation, gel film formation (a method of extracting and removing the solvent after once cooling and gelling the film forming stock solution to obtain the PVA film), and combination thereof, melt extrusion film formation where the above film forming stock solution thus obtained is extruded from a T die or the like using an extruder or the like, inflation molding, and the like. Among the methods described above, the casting film-forming method and the melt extrusion film-forming method are preferable because the homogeneous film can be obtained with high productivity. The casting film-forming method or the melt extrusion film-forming method for the water-soluble film will be described below.

In a case of forming the water-soluble film by casting film-formation method or melt extrusion film-formation method, the above film forming stock solution is casted in the form of film on a support, such as a metal roll and a metal belt and heated to remove the solvent and thus solidified to be formed into a film. The solidified film is released from the support, dried as needed by a drying roll, a drying furnace, and the like, and further heat treated as needed to be wound and thus allowed to be produced into a long water-soluble film in a roll.

A volatile content concentration of the film forming stock solution (concentration of the volatile components, such as the solvent removed by volatilization and evaporation during film formation and the like) is preferably in the range of 50 to 90% by mass and more preferably in the range of 55 to 80% by mass. The volatile content concentration of less than 50% by mass causes an increase in the viscosity of the film forming stock solution and sometimes causes difficulty in film formation. Meanwhile, the volatile content concentration of more than 90% by mass causes a decrease in the viscosity and is likely to impair uniformity in the thickness of the film to be obtained.

As used herein, the term "volatile content ratio of the film forming stock solution" refers to a value obtained by the following formula.

$$\text{Volatile content ratio (\% by mass) of film forming stock solution}=\{(Wa-Wb)/Wa\}\times 100$$

In the formula, Wa represents the mass (g) of the film forming stock solution, and Wb represents the mass (g) after drying the film forming stock solution of Wa (g) in an electric heat dryer at 105° C. for 16 hours.

Examples of the method of preparing the film forming stock solution include, but not particularly limited to, a method where the PVA and the additives such as a plasticizer, a surfactant and the like are dissolved in a dissolution tank or the like, a method where the PVA in a hydrated state is melt kneaded together with a plasticizer, a surfactant, and the like, using a single-screw extruder or twin-screw extruder, and the like.

The film of the film forming stock solution poured onto the support is solidified by heating and drying on the support and in the subsequent drying process, and the drying conditions at that time have a great effect on the surface condition of the film. For example, when the drying temperature is increased, the drying speed becomes faster, so that concentration of the surfactant on the film surface is less likely to occur, which affects the abundance ratio of carbonyl among all carbon bonds on the film surface. In addition, when the humidity of the atmosphere in drying the film of the film forming stock solution is low, hydrophobic groups tend to gather on the film surface, and conversely, when the humidity is high, hydrophilic groups tend to gather.

Therefore, adjusting the drying conditions during film formation is also one of the methods for controlling the abundance ratio of C═O on the film surface.

The drying conditions during film formation affect the production rate of the film and may limit the raw materials used such as surfactants. Therefore, in order to make the abundance ratio of C═O on the film surface within the range of the present invention, it is preferable not only to adjust the drying conditions during film formation, but also to use it together with a method of surface-modifying the formed film, as will be described later.

A surface temperature of a first drying roll or a first drying belt (hereinafter, may be referred to as "first drying roll or the like"), which is the support for casting the film forming stock solution, is preferably 50 to 110° C. When the surface temperature is less than 50° C., the water solubility and productivity of the film tend to decrease. When the temperature exceeds 110° C., there is a tendency that film surface abnormalities such as foaming are likely to occur, and the mechanical strength of the film tends to decrease due to a decrease in crystallinity. More preferably, the surface temperature is 60 to 105° C.

At the same time as heating the film of the film forming stock solution on the first drying roll or the like, a drying rate may be adjusted by uniformly blowing hot air at a wind speed of 1 to 10 m/sec to the entire area of a non-contact surface side of the film of the film forming stock solution with the first drying roll or the like. From the viewpoint of drying efficiency and uniformity of drying, the temperature of the hot air blown to the non-contact surface side is preferably 50 to 150° C., more preferably 70 to 120° C. From the viewpoint of facilitating adjustment of the abundance ratio of C═O on the film surface within the range of the present invention, a water content in the hot air is preferably 4 to 90 g/m$^3$, more preferably 5 to 70 g/m$^3$, and even more preferably 6 to 50 g/m$^3$.

The film peeled off from the first drying roll or the like continues to be used as a subsequent support (hereinafter, may be referred to as "drying roll or the like", and when there are two or more, "second drying roll", "third drying roll", or "second drying belt", "third drying belt") is preferably dried to the volatile content ratio of 5 to 50% by mass. After drying to the preferred range of the volatile content ratio, it is peeled off and further dried if necessary. A drying method is not particularly limited, and a method using a drying oven can be used in addition to the method of contacting with the drying roll or the like. When the film is dried with a plurality of drying rolls or the like, it is preferable to alternately bring one surface and the other surface of the film into contact with the second drying roll and thereafter, in order to make both surfaces uniform. For example, the number after the second drying roll is preferably 3 or more, more preferably 4 or more, and even more preferably 5 to 30 including the second drying roll. The temperature after the drying oven, the second drying roll, or the second drying belt is preferably 40° C. or more and 110° C. or less. The upper limit of the temperature after the drying oven, the second drying roll, or the second drying belt is more preferably 100° C., and more preferably 95° C. When the temperature after the drying oven, second drying roll or second drying belt is too high, the cold water solubility of the film may be reduced. On the other hand, the lower limit of the temperature after the drying oven and the second drying roll is more preferably 45° C., and more preferably 50° C. When the temperature after the drying oven, the second drying roll or the second drying belt is too low, the mechanical strength of the film may decrease.

The obtained water-soluble film can be further heat-treated as necessary. By performing heat treatment, it is possible to adjust the strength and water solubility of the film. The heat treatment temperature is preferably 60° C. or more and 135° C. or less. The heat treatment temperature is more preferably 130° C. or less. If the heat treatment temperature is too high, there is a risk that the amount of heat applied will be too large and the cold water solubility will decrease.

The water-soluble film thus produced is subjected to further humidity control, cutting of both ends (edges) of the film, and the like as needed, and wound in a roll on a cylindrical core and moisture-proof packaged to form a product.

The volatile content ratio of the PVA film finally obtained by a series of treatments is not particularly limited, but is preferably 1 to 5% by mass, more preferably 2 to 4% by mass.

As described above, the surface-modified water-soluble film is one of the preferred embodiments of the present invention. The method of surface modification is not particularly limited, but it is preferably any of ultraviolet treatment, ozone treatment, corona treatment, and plasma treatment. Among them, the corona treatment is superior in terms of treatment speed, safety, ease of adjustment of the degree of treatment, etc., and is more preferable.

The condition for the corona treatment is preferably in the range of 150 to 400 W·min/m$^2$, more preferably in the range of 180 to 350 W·min/m$^2$, and even more preferably in the range of 200 to 300 W·min/m$^2$ from the viewpoint of resistance to oxidative deterioration and damage such as coloring and perforation of the film. In this regard, the amount of discharge is obtained by the following formula (1).

$$\text{Amount of discharge (W·min/m}^2\text{)} = \text{Output (W/m)} / \text{Processing speed (m/min)} \quad (1)$$

<Application>

The water-soluble film of the present invention has an excellent balance of cold water solubility and resistance to oxidative deterioration and can be suitably used for various water-soluble film applications. Examples of the above-mentioned film applications include chemical packaging films, liquid pressure transfer base films, embroidery base films, release films for forming artificial marble, seed packaging films, waste storage bag films, and the like. Among these, the water-soluble film of the present invention is preferably used as the chemical packaging film because the effects of the present invention are exhibited more remarkably, and in particular, it is preferably used as an oxidizable chemical packaging film.

When the water-soluble film of the present invention is used as the chemical packaging film, the types of chemicals include, for example, pesticides, detergents (including bleaching agents), disinfectants, and the like. The physical properties of the chemical are not particularly limited, and may be acidic, neutral, or alkaline. In addition, the chemical may contain a boron-containing compound. The chemical may be in the form of powder, mass, gel or liquid. The form of packaging is also not particularly limited, and the form of unit packaging (preferably sealed packaging) in which the chemical is packaged by unit amount is preferred. The package of the present invention is obtained by applying the water-soluble film of the present invention to the chemical packaging film to package the chemical.

EXAMPLES

Hereinafter, the present invention will be specifically described below with reference to examples and the like, but the present invention is not limited by the following examples. Evaluation items and evaluation methods adopted in the following examples and comparative examples are as follows.

(1) X-Ray Photoelectron Spectroscopy (XPS) measurement conditions

The film was cut into a size of 5 mm×5 mm and set on a measurement base via a conductive double-sided tape. In the measurement, both sides of the film were measured. XPS measured each sample under the following measurement conditions.

Measuring device: Ohi Quantera SXM (ULVAX-PHI. INC.)

Analysis software: Multi Pack ver9.0 (ULVAX-PHI. INC.)

X-ray source: monochromatic AlKα (1486.6 eV)

X-ray beam diameter: 100 μmφ (25 W, 15 kV)

Measurement range: 100 μm×300 μm

Signal capture angle: 45°

Charge neutralization conditions: neutralization electron gun, $Ar^+$ ion gun

Degree of vacuum: $1\times10^{-6}$ Pa

In addition, the following atoms were measured in the following examples and comparative examples.

Measurement atoms: C1s, N1s, O1s, F1s, Na1s, Si2p, P2p, S2p

The obtained spectrum was analyzed to determine the abundance ratios of C1s and O1s.

Further, the obtained C1s peak was automatically fitted by the analysis software described above, and the abundance ratios of carbon bonding states C—C and C═O were determined.

(2) Evaluation of Cold Water Solubility (Complete Dissolution Time of Water-Soluble Film in Water at 10° C.)

The complete dissolution time of the water-soluble film in deionized water at 10° C. was determined by the method described above.

(3) Evaluation of Resistance to Oxidative Deterioration

Two 11 cm×16 cm water-soluble films were cut out, and a bag (10 cm×15 cm) was produced with a three-sided seal (seal width of 5 mm). After 35 g of a liquid bleach containing sodium percarbonate as a main component was put into this bag, the remaining one side was heat-sealed to obtain a package having a chemical inside. After wrapping an outside of the package obtained above using a film in which polyethylene is laminated on the surface of aluminum (hereinafter, may be abbreviated as "aluminum laminated film"), a double packaged product was created by heat-sealing.

As an accelerated test for long-term storage, the double packaged product was placed in a thermostat at 40° C. for 3 weeks, and then the coloration of the water-soluble film was visually evaluated according to the following criteria.

A: Coloring is not recognized

B: Colored slightly yellow

C: Clearly colored yellow

Example 1

A film forming stock solution containing 100 parts by mass of PVA (degree of saponification: 88 mol %, viscosity average polymerization degree: 1700) obtained by saponifying polyvinyl acetate, 20 parts by mass of glycerin as a plasticizer, 0.05 parts by mass of lauric acid diethanolamide, which contained 10% by mass of lauric acid diethanolamine as an impurity, as a surfactant and water, and having a volatile content ratio of 60% by mass was prepared. On a first drying roll adjusted to a surface temperature of 100° C., the filtered film forming stock solution is discharged in the form of a film, and on the first drying roll, the entire non-contact surface of the first drying roll was dried by blowing hot air having a water content of 24.9 g/m$^3$ and a temperature of 85° C. at a speed of 5 m/sec. Next, the film of the film forming stock solution is peel off from the first drying roll, and the other side of the film of the film forming stock solution, which was different from the side that had been in contact with the first drying roll, was brought into contact with the surface of a first subsequent drying roll (hereinafter, may be referred to as "second drying roll") to dry it. After that, one side and the other side of the film of the film forming stock solution are applied to six drying rolls including the second drying roll (hereinafter, may be referred to as "third drying roll", "fourth drying roll", and the last drying roll is referred to as "seventh drying roll") were sequentially and alternately dried to obtain a film. The surface temperature of the second drying roll and subsequent drying rolls were all 90° C. Both sides of the obtained film are further alternately contacted with a plurality of heat treatment rolls having a surface temperature of 90° C. for 30 seconds for heat treatment, wound on a polyvinyl chloride pipe, and a water-soluble film (thickness 35 μm, length [Film flow direction] 1200 m) was obtained.

Both sides of the obtained water-soluble film were measured by XPS. As a result, on one film surface, the abundance ratio of carbonyl (C═O) in all carbon bonds was 1.6%, the ratio of the abundance ratio of carbon-carbon single bond to the abundance ratio of carbonyl (C—C/C═O) was 29.5, the abundance ratio of carbon in all elements was 70.8%, the abundance ratio of oxygen is 28.3% and the ratio of carbon to oxygen (C/O) was 2.5. In addition, on the other film surface, the abundance ratio of carbonyl (C═O) in all carbon bonds was 1.3%, the ratio of the abundance ratio of carbon-carbon single bond to the abundance ratio of carbonyl (C—C/C═O) was 45.7, the abundance ratio of carbon (C abundance ratio) in all elements was 73.3%, the abundance ratio of oxygen (O abundance ratio) is 24.7% and the ratio of carbon to oxygen (C/O) was 3.0. This film had the complete dissolution time (cold water solubility) of 88 seconds, and the evaluation result of resistance to oxidative deterioration was A.

Table 1 summarizes the composition of the film forming stock solution, the film forming conditions, the XPS analysis results of the obtained water-soluble film and the evaluation results. The surface in contact with the first drying roll was called surface 1, and the opposite surface was called surface 2.

Example 2

A water-soluble film was obtained in the same manner as in Example 1, except that the PVA was changed to methyl maleate (MA)-modified PVA obtained by saponifying polyvinyl acetate (degree of saponification: 99 mol %, degree of polymerization: 1700, degree of MA modification: 5 mol %). Table 1 shows the results of XPS analysis, the complete dissolution time (cold water solubility), and the evaluation result of the resistance to oxidative deterioration of this water-soluble film.

Examples 3 and 4

A portion of the film obtained in Example 2 was unwound, and both sides of the portion were treated with a corona treatment apparatus under conditions of 250 W·min/m$^2$ (Example 3) and 350 W·min/m$^2$ (Example 4), and then wound up. Table 1 shows the results of XPS analysis, the complete dissolution time (cold water solubility), and the evaluation result of the resistance to oxidative deterioration of this water-soluble film.

Example 5

A water-soluble film was obtained in the same manner as in Example 1, except that the amount of the surfactant was 0.2 parts by mass. Table 1 shows the results of XPS analysis, complete dissolution time (cold water solubility), and the evaluation result of the resistance to oxidative deterioration of this water-soluble film.

Comparative Example 1

A portion of the film obtained in Example 1 was unwound, and both sides of the portion were treated with the corona treatment apparatus under condition of 410 W·min/m$^2$, and then wound up. Table 1 shows the results of XPS analysis, the complete dissolution time (cold water solubility), and the evaluation result of the resistance to oxidative deterioration of this water-soluble film.

Comparative Example 2

A water-soluble film was obtained in the same manner as in Example 1, except that the surfactant was changed to polyoxyethylene dodecyl ether (with a condensation degree of polyoxyethylene in the range of 1 to 10 centering on 4). Table 1 shows the results of XPS analysis, the complete dissolution time (cold water solubility), and the evaluation result of the resistance to oxidative deterioration of this water-soluble film.

Comparative Example 3

A water-soluble film was obtained in the same manner as in Example 1, except that the PVA was changed to PVA obtained by saponifying polyvinyl acetate (degree of saponification: 99 mol %, degree of polymerization: 1700). Table 1 shows the results of XPS analysis, the complete dissolution time (cold water solubility), and the evaluation result of the resistance to oxidative deterioration of this water-soluble film.

Comparative Example 4

A PVA film was obtained in the same manner as in Example 1, except that the surface temperature of the first drying roll was set to 115° C., the amount of water contained in the hot air blown over the entire non-contact surface of the first drying roll was set to 0.5 g/m, and the surface temperatures of the second drying roll and the subsequent drying rolls were changed to 115° C. Table 1 shows the results of XPS analysis, the complete dissolution time (cold water solubility), and the evaluation result of the resistance to oxidative deterioration of this water-soluble film.

TABLE 1

| | | Example 1 | | Example 2 | | Example 3 | | Example 4 | | Example 5 | | Comparative Example 1 | | Comparative Example 2 | | Comparative Example 3 | | Comparative Example 4 | |
|---|---|---|---|---|---|---|---|---|---|---|---|---|---|---|---|---|---|---|---|
| Composition of film framing stock solution | PVA | Unmodified | | MA5 | | MA5 | | MA5 | | Unmodified | | Unmodified | | Unmodified | | Unmodified | | Unmodified | |
| | Degree of saponification | 88 | | 99 | | 99 | | 99 | | 88 | | 88 | | 88 | | 99 | | 88 | |
| | Surfactant | A | | A | | A | | A | | A | | A | | B | | A | | A | |
| | Amount of surfactant (part by mass) | 0.05 | | 0.05 | | 0.05 | | 0.05 | | 0.2 | | 0.05 | | 0.05 | | 0.05 | | 0.05 | |
| Film forming condtions | Tempterature of first drying roll (° C.) | 100 | | 100 | | 100 | | 100 | | 100 | | 100 | | 100 | | 100 | | 115 | |
| | Amount of water contained in hot air blown at first drying roll (g/m$^3$) | 24.9 | | 24.9 | | 24.9 | | 24.9 | | 24.9 | | 24.9 | | 24.9 | | 24.9 | | 0.5 | |
| | Temperatures of second drying roll and subsequent drying rolls (° C.) | 90 | | 90 | | 90 | | 90 | | 90 | | 90 | | 90 | | 90 | | 115 | |
| | Common treatment condition (W · min/m$^2$) | None | | None | | 250 | | 350 | | None | | 410 | | None | | None | | None | |
| | | Surface 1 | Surface 2 | Surface 1 | Surface 2 | Surface 1 | Surface 2 | Surface 1 | Surface 2 | Surface 1 | Surface 2 | Surface 1 | Surface 2 | Surface 1 | Surface 2 | Surface 1 | Surface 2 | Surface 1 | Surface 2 |
| XPS analysis results | Abundance ratio of C═O (%) | 1.6 | 1.3 | 4.7 | 3.6 | 3.9 | 2.8 | 4.9 | 4.8 | 4.2 | 2.9 | 6.2 | 3.9 | 0.8 | 0.5 | 0.1 | 0.0 | 0.8 | 0.6 |
| | C—C/C═O | 29.5 | 43.7 | 10.5 | 15.9 | 10.2 | 13.2 | 9.2 | 9.9 | 9.9 | 18.1 | 7.2 | 5.3 | 65.9 | 72.2 | >100 | >100 | 48.5 | 55.2 |
| | Abundance ratio of carbon (%) | 70.8 | 73.3 | 60.5 | 67.5 | 55.5 | 61.8 | 51.2 | 68.8 | 65.1 | 68.9 | 48.5 | 49.2 | 72.8 | 77.3 | 69.6 | 54.1 | 73.3 | 79.2 |
| | Abundance ratio of oxygen (%) | 28.3 | 24.7 | 21.6 | 21.6 | 23.4 | 22.4 | 28.8 | 14.1 | 24.6 | 27.7 | 33.1 | 38.1 | 26.8 | 24.7 | 14.1 | 18.1 | 22.7 | 19.9 |
| | C/O | 2.5 | 3.0 | 2.8 | 3.1 | 2.4 | 2.8 | 1.8 | 4.9 | 2.6 | 2.5 | 1.5 | 1.3 | 2.7 | 3.1 | 4.9 | 3.0 | 3.2 | 4.0 |
| Evaulation results | Cold water solubility (min) | 88 | | 73 | | 55 | | 42 | | 66 | | 40 | | 153 | | Insoluble | | 133 | |
| | Resistance to oxidative deterioration | A | | A | | A | | B | | A | | C | | A | | A | | A | |

Surfactant A lauric acid diethanolamide
Surfactant B polyoxyethylene dodecyl ether From the above results, it can be seen that the water-soluble film of the present invention has an excellent balance of cold water solubility and resistance to oxidative deterioration. Therefore, the water-soluble film of the present invention can be used for various water-soluble film applications, such as chemical packaging films, liquid pressure transfer base films, embroidery base films, release films for forming artificial marble, seed packaging films, waste storage bag films, and the like. Among these, the water-soluble film of the present invention is more preferably used as the chemical packaging film and is particularly used as an oxidative chemical packaging film for pesticides, detergents (including bleaching agents) and the like.

What is claimed is:

1. A water-soluble film containing at least 50% by mass of a polyvinyl alcohol resin, and a nonionic surfactant including a dialkanolamide of an aliphatic dicarboxylic acid, wherein the water-soluble film has a surface on at least one side in which an abundance ratio of carbonyl in all carbon bonds obtained by X-ray photoelectron spectroscopy is in the range of 1 to 5%, and a complete dissolution time in water at 10° C. is 120 seconds or less.

2. The water-soluble film as claimed in claim 1, wherein on the surface where the abundance ratio of carbonyl in all the carbon bonds is within the above range, a ratio (C—C/C═O) of an abundance ratio of carbon-carbon single bond obtained by the X-ray photoelectron spectroscopy to the abundance ratio of carbonyl is 10 to 50.

3. The water-soluble film as claimed in claim 1, wherein on the surface where the abundance ratio of carbonyl in all the carbon bonds is within the above range, an abundance ratio of carbon in all elements obtained by the X-ray photoelectron spectroscopy is 50 to 70%, an abundance ratio of oxygen is 20 to 35%, and a ratio of carbon to oxygen (C/O) is 1.5 to 3.5.

4. The water-soluble film as claimed in claim 1, wherein the surface having the abundance ratio of carbonyl in all the carbon bonds within the above range is subjected to surface modification.

5. The water-soluble film as claimed in claim 4, wherein the surface modification is by any method of ultraviolet treatment, ozone treatment, corona treatment, and plasma treatment.

6. A package in which the water-soluble film as claimed in claim 1 stores a chemical.

7. The package as claimed in claim 6, wherein the chemical is a pesticide or a detergent.

8. The package as claimed in claim 6, wherein the chemical is in a liquid form.

9. The package as claimed in claim 6, wherein the chemical is stored so that the surface having the abundance ratio of carbonyl in all the carbon bonds within the range of 1 to 5% is in contact with the chemical.

10. The water-soluble film as claimed in claim 1, wherein the polyvinyl alcohol resin includes methyl maleate-modified polyvinyl alcohol resin.

11. The water-soluble film as claimed in claim 1, wherein the polyvinyl alcohol resin has a degree of saponification of 64 mol % to 99.99 mol %.

12. The water-soluble film as claimed in claim 1, wherein the polyvinyl alcohol resin includes unmodified polyvinyl alcohol resin.

13. The water-soluble film as claimed in claim 1, containing one type of polyvinyl alcohol resin singly or two or more types of polyvinyl alcohol resin having different degrees of polymerization, saponification, and/or modification.

14. The water-soluble film as claimed in claim 1, wherein the water-soluble film does not contain starch.

15. The water-soluble film as claimed in claim 1, wherein the water-soluble film is formed by a process that includes:

forming a film forming stock solution that includes the polyvinyl alcohol resin, and pouring the film forming stock solution onto a first drying roll to form a first film, wherein the first drying roll has a surface temperature of 50 to 110° C.

16. The water-soluble film as claimed in claim 15, wherein the process further includes heating the first film on the first drying roll by blowing hot air at a wind speed of 1 to 10 m/sec to an area of a non-contact surface side of the first film with the first drying roll.

17. The water-soluble film as claimed in claim 16, wherein the hot air has a water content of 4 to 90 g/$m^3$.

18. The water-soluble film as claimed in claim 15, wherein the process further includes contacting the first film with a second drying roll.

19. The water-soluble film as claimed in claim 18, wherein the second drying roll has a surface temperature of 40° C. or more and 110° C. or less.

* * * * *